United States Patent
Krigmont

(10) Patent No.: US 11,406,933 B1
(45) Date of Patent: Aug. 9, 2022

(54) FLUE GAS CONDITIONING SYSTEM CONTROLLER

(71) Applicant: Henry Krigmont, Seal Beach, CA (US)

(72) Inventor: Henry Krigmont, Seal Beach, CA (US)

( * ) Notice: Subject to any disclaimer, the term of this patent is extended or adjusted under 35 U.S.C. 154(b) by 243 days.

(21) Appl. No.: 16/892,243

(22) Filed: Jun. 3, 2020

Related U.S. Application Data

(60) Provisional application No. 62/856,661, filed on Jun. 3, 2019.

(51) Int. Cl.
*B01D 53/34* (2006.01)
*B01D 53/50* (2006.01)
*B01D 53/58* (2006.01)

(52) U.S. Cl.
CPC ......... *B01D 53/346* (2013.01); *B01D 53/502* (2013.01); *B01D 53/58* (2013.01); *B01D 2257/302* (2013.01); *B01D 2258/0283* (2013.01)

(58) Field of Classification Search
CPC ... G05B 1/00; G05B 1/11; G05B 6/00; G05B 11/00; G05B 11/06; G05B 11/32; G05B 11/36; G05B 13/00; G05B 21/00; G05D 7/00; G05D 7/0617; G05D 7/0676; G05D 21/00; G05D 21/02; G05D 99/00; G05D 11/00; B01J 19/0006; B01J 19/0033; B01J 2204/002; B01J 2219/00049; B01J 2219/00164; B01J 2219/00222; B01D 53/74; B01D 53/75; B01D 53/90; B01D 2258/0283; B01D 2259/12; B01D 35/06; B03C 3/36; F23J 15/02; F23J 15/022; F23J 2215/00; F23J 2217/102; F23J 2900/00
See application file for complete search history.

(56) References Cited

U.S. PATENT DOCUMENTS

| | | | | |
|---|---|---|---|---|
| 3,523,407 | A * | 8/1970 | Humbert | B03C 3/013 165/4 |
| 7,226,570 | B2 * | 6/2007 | Spencer | B01D 51/10 423/242.1 |
| 2005/0238549 | A1 * | 10/2005 | Hammel | B01D 53/8665 422/168 |
| 2006/0058899 | A1 * | 3/2006 | Boyden | G05B 13/021 700/28 |
| 2016/0158701 | A1 * | 6/2016 | Brown | B01D 53/8631 110/345 |
| 2017/0203252 | A1 * | 7/2017 | Johnson | F23J 15/02 |
| 2021/0319373 | A1 * | 10/2021 | Gao | B01D 53/75 |

* cited by examiner

*Primary Examiner* — Timothy C Vanoy
(74) *Attorney, Agent, or Firm* — Clifford H. Kraft

(57) ABSTRACT

An FGC conditioning agent injection-control system, where conditioning agent over- or under-injection can be prevented while maximizing a precipitator's performance. The injection rate is typically regulated using feed forward signal proportional to the coal flow, which could be represented by the boiler load augmented by a feedback from the voltage control and electrical conditions in the ESP, sulfur dioxide emissions signaling any changes in the coal quality, opacity monitor data, and other parameters. Both the feed forward and the feedback information and signals from the existing injection skids are analyzed, and the optimal injection rate for the current conditions is determined. With fast, continuous and automatic sampling and analysis, the system responds quickly as each parameter changes, recalculating the optimal injection rate and automatically sends the new injection set-point to the injection skid.

16 Claims, 9 Drawing Sheets

FLUE GAS CONDITIONING SYSTEM CONTROLLER

BACKGROUND

The present invention is related to, and claims priority from, U.S. Provisional Patent Application No. 62/856,661 filed Jun. 3, 2019. Application 62/856,661 is hereby incorporated by reference in its entirety.

FIELD OF THE INVENTION

The present invention relates generally to power plants and more particularly to a flue gas conditioning system controller.

DESCRIPTION OF THE PROBLEM SOLVED

The present invention relates to coal-fired power plants, and more particularly to a Flue Gas Conditioning (FGC) automated injection system controller (CONTROLLER).

Conditioning agents are injected into the flue gas stream of coal-fired boilers to improve performance of precipitators to minimize pollution. The quantity of a conditioning agent required depends on various factors such as the required performance enhancement factor, the coal and ash analysis, the boiler load, and the flue-gas flow rate and temperature, amongst others. The actual injection rate is site-dependent and should be adjusted according to changes in the boiler load and coal flow. Since the cost of the conditioning agent constitutes a significant part of total operational costs, overdosing should be avoided.

A major problem in present systems is over- or under-injection and hence, a degradation of performance and an increase in operating costs. It would be advantageous to have a FGC system control system and method that overcomes these problems.

SUMMARY OF THE INVENTION

With modern FGC injection-control systems, conditioning agent over- or under-injection can be prevented while maximizing a precipitator's performance. The injection rate is typically regulated using feed forward signal proportional to the coal flow, which could be represented by the boiler load augmented by a feedback from the voltage control and electrical conditions in the ESP, sulfur dioxide emissions signaling any changes in the coal quality, opacity monitor data, and other parameters. Both the feed forward and the feedback information and signals from the existing injection skids are analyzed, and the optimal injection rate for the current conditions is determined. With fast, continuous and automatic sampling and analysis, the system responds quickly as each parameter changes, recalculating the optimal injection rate and automatically sends the new injection set-point to the injection skid. The benefits of utilizing an automatic injection-rate control system include:

eliminating of visual monitoring and manual adjustment of the conditioning-agent injection rate by plant personnel;

preventing over- or under-conditioning of the flue gas; 1 providing instant and automatic injection-system response to changes in the boiler loads or coal supplies; and maximizing the precipitator performance and maintaining the lowest possible opacity.

The proposed CONTROLLER approach offers precise control over additives: i.e. the content of the combustion or exhaust gas stream, so that there is virtually no sulfur trioxide, sulfuric acid, or ammonia emitted to the atmosphere. The ammonia addition mass flow rate is adjusted responsive to the sulfur trioxide mass flow rate with a minimal lag time, thereby reducing the time when non-optimal additions are made. The approach is readily implemented utilizing commercially available components.

DESCRIPTION OF THE PREFERRED EMBODIMENTS

Figure 1:
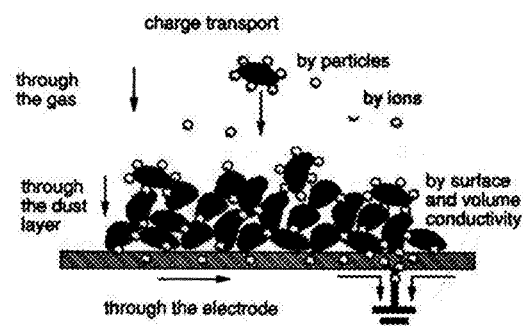
FIG. 1 is an illustration of the Current and Charges Flow through the Dust layer on the Collecting Electrode.
Figure 2:
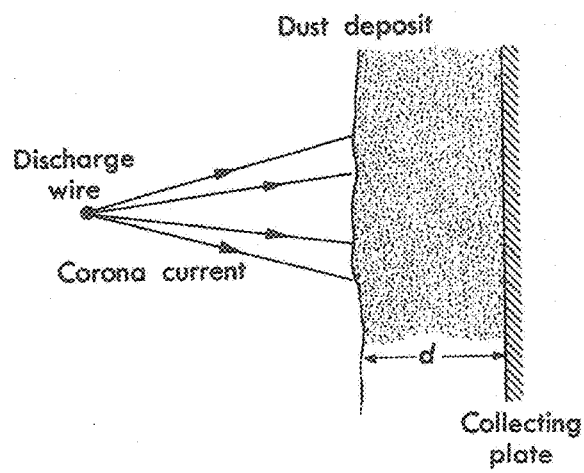
FIG. 2. shows Corona Current and Its Relation to the Dust on Collecting Electrode.

The injection of sulfur trioxide ($SO_3$) into the flue gas stream from a coal-fired boiler is used to lower the resistivity of the fly ash from coal combustion to optimize the collection of fly ash in an electrostatic precipitator. In fact, the following discussion is applicable to virtually any dust laden exhaust gas stream where the dust possesses certain unfavorable electrical properties. The efficiency of collection of fly ash in electrostatic precipitators is proportional to the electrical power input to the precipitator. The power input to the precipitator is proportional to the current density at which the precipitator operates. The current density at which a precipitator can be operated is directly related to the dielectric strength of the dust layer divided by the resistivity of dust layer (FIG. 1). In general, as the dust layer resistivity decreases, the operating current density for the precipitator increases. If the dust layer resistivity is too high, then the electrical potential across the dust layer increases to the point at which the dust layer electrically breaks down forming-so-called back corona. If the dust layer resistivity is too low, the electrostatic holding force to keep the dust layer collected on the precipitator collection plates is too low (FIG. 2). This may result in the collected dust being re-entrained in the flue gas stream increasing emissions and reducing the efficiency of the precipitator.

Dual FGC is defined as a simultaneous and independent injection of $SO_3$ and ammonia ($NH_3$). In Dual FGC, ammonia is combined with $SO_3$ (in fact, it reacts with the sulfuric acid vapor) in the flue gas to produce ammonium sulfate and ammonium bisulfate. The latter compound is semi-liquid at typical ESP operating temperatures and triggers several beneficial effects. Firstly, it co-precipitates with the ash and increases the cohesivity of the ash, thereby reducing ash re-entrainment as well as allows for the unburned carbon particles to be captured and retained in the precipitated dust layer more efficiently. Lastly, the presence of the ammonia compound makes certain difficult ashes easier to condition. It is important to add ammonia at the correct rate to ensure best ESP performance. As discussed previously, ammonia reacts with the sulfur trioxide and water vapor, producing the ammonium bisulfate, $(NH_4)HSO_4$:

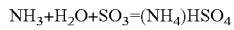

or ammonium sulfate, $(NH_4)_2SO_4$:

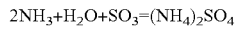

In the first reaction to produce ammonium bisulfate, one mole of ammonia is consumed for each mole of sulfur trioxide. The concept of a "mole" is an established chemical convention that provides a convenient method for expressing relations between the amounts of substances that react together. A gram-mole of a substance is its atomic weight expressed in grams. Thus, a gram-mole of ammonia weighs about 17 grams, and a gram-mole of sulfur trioxide weighs about 64 grams. Similarly, for the second reaction to produce ammonium sulfate, two moles of ammonia are consumed for each mole of sulfur trioxide. When a molar ratio of 2 moles of ammonia to one mole of sulfur trioxide is maintained, the injection rate is about 34 grams of ammonia for each 64 grams of sulfur trioxide in the gas stream.

Yet another way of expressing the chemistry is through the Normal Stoichiometric Ratio or NSR. If the desired molar ratio of ammonia to sulfur trioxide is 2 to 1 to produce ammonium sulfate, than it is defined as a normal stoichiometric ratio of 1.0. If the molar ratio of ammonia to sulfur trioxide falls to less than 2 to 1, the normal stoichiometric ratio becomes less than 1.0. The Dual FGC automatic injection rate controller logic should be designed to seek the best suitable molar ratio of ammonia to sulfur trioxide, which as experience shows should not exceed ratio of 2 to 1, or, alternatively stated, the optimized normal stoichiometric ratio should be less than 1.0. Typically, the amount of ammonia is generally held below the gaseous sulfur trioxide concentrations on a mole or parts per million basis.

Ammonium sulfate is produced as a fine powder which can be removed from the combustion gas stream with an electrostatic precipitator. Ammonium bisulfate, on the other hand, has significantly different chemical properties and may appear as a sticky substance that can get deposited into gas passageways and obstruct them, requiring an expensive cleaning operation. To produce ammonium sulfate, the molar ratio of ammonia to sulfur trioxide is at least about 2 to 1. At the molar ratio less than about 2 to 1, a partial ammonium bisulfate and ammonium sulfate would result leaning more towards ammonium bisulfate as the molar ratio approaches 1 to 1. The Dual FGC automatic injection rate controller must ensure that both ammonium sulfate and ammonium bisulfate (in appropriate quantities) would result from the addition of ammonia into the combustion gas stream containing the $SO_3$.

The issue is resolved by a ratio in which ammonia is added to the flue gas stream to ensure that ammonium bisulfate rather than ammonium sulfate is produced as a result of the chemical reaction. Ammonium bisulfate will produce a desired sticky product when contacting particulate fly ash. The use of ammonium bisulfate increases cohesivity of the fly ash. This cohesivity or stickiness causes better plate adhesion. On the other hand, ammonium sulfate will add a fine particulate product to the fly ash resulting in the improved inter-electrode electrical field.

The goal of creating certain ammonium compounds commands the need for the addition of a stoichiometric amount or a little less of ammonia. That is, ammonia to $SO_3$ ideally in a ratio of 1 to 1 or a little less of ammonia. The amount of ammonia to be added is based on the total amount of $SO_3$ present in the flue gas. This total amount of $SO_3$ is that amount of "native or natural" $SO_3$ inherently present due to the burning of the coal and the amount of $SO_3$ added by the $SO_3$ FGC to optimize resistivity. A method for determining the amount of $SO_3$ in flue gas can be accomplished by an algorithm described below.

1.1 Addition and Control of Sulfur Trioxide

Power consumption (P) of the electrostatic precipitator is an excellent measure of the effectiveness of the conditioning process. The power consumption is dependent upon the amount of particulate matter being deposited upon the collection plates. Where the power consumption is low, few particles are deposited. Maximum power consumption results from a large voltage charging particles and electrical current carried through the deposited particles to the collector electrode, and thence capture of a large fraction of the particulate matter in the flue gas.

Figure 3:
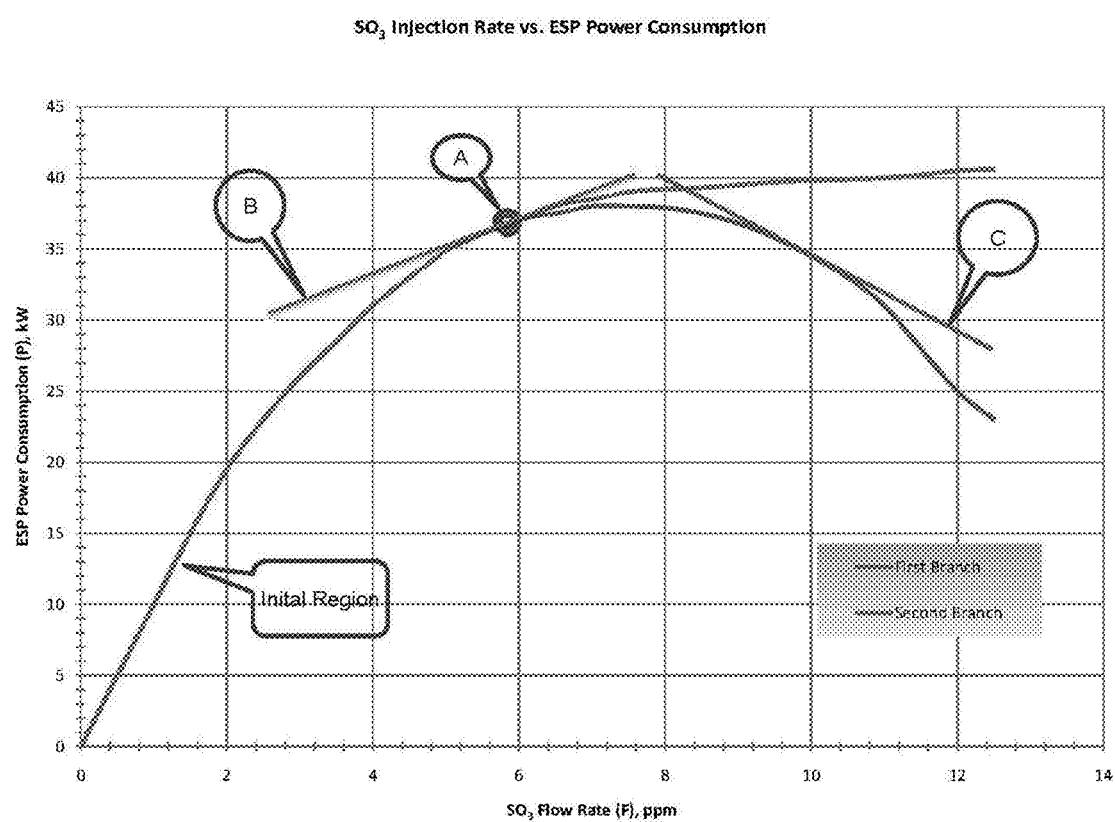
FIG. 3. shows $SO_3$ Injection vs. ESP Power Consumption.

Briefly, the proposed algorithm, controls the $SO_3$ flow rate F as a function of time; measuring the electrostatic precipitator power consumption P as a function of time; and controlling the flow rate of the $SO_3$ such that the first derivative of the power consumption as a function of the flow rate of the conditioning agent, dP/dF is within a preselected operating range (FIG. 3). (As used herein, the flow rate F is expressed relative to the flow rate of the flue gas, and is typically in parts per million by volume. Thus, to determine the mass flow rate of the conditioning agent, as in pounds per unit time, it is necessary to multiply F by the flow rate of the flue gas.)

For combustion conditions resulting in insufficient electrical conductivity of the particulate matter in the flue gas stream to achieve efficient collection in the precipitator, two possible functional variations have been observed in actual power plants for the power consumption of the electrostatic precipitator as a function of the flow rate of a conditioning agent such as sulfur trioxide. In both cases, the power consumption rises as small and increasing amounts of the conditioning agent are added per unit time. As the power consumption rises further, there are two possible relationships, depending upon the precipitator design, flow rates of flue gas, and character of the coal and thence the particulate matter. In one type of behavior, the power consumption reaches a maximum and then decreases with increasing flow of conditioning agent. In the other type of behavior, the power consumption continuously and gradually increases with increasing flow of conditioning agent.

It is not always possible to know beforehand which characteristic will be observed in any set of operating conditions. The proposed algorithm utilizes the slope of the functional relationship as the basis for control of the conditioning agent flow rate. At flow rates of conditioning agent near or just below the possible branching point, the slope is always positive. A preselected value of the slope, termed the operating range, is selected as the control point, and the flow rate of the conditioning agent is adjusted to maintain the slope within the operating range. If the measured slope is less than the operating range, the flow rate of conditioning agent is decreased. If the measured slope is greater than the operating range, the flow rate of conditioning agent is increased.

In some cases it is observed that there is a measurable lag time, of as much as several hours, from the making of the adjustment in the flow rate of conditioning agent until the result is observed in a change in power consumption and derivative of the power consumption-flow rate curve. The present algorithm permits a lag time to be incorporated into the analysis, so that the "derivative" is based upon presently measured power consumption but a previously altered flow rate of conditioning agent.

1.2 Addition and Control of Ammonia

Injection of $NH_3$ into the flue gases in the presence of $SO_3$ can lead to the formation of submicron particles of ammonium sulfates. Particles formation due to chemical reaction between $NH_3$ and $SO_3$ is a complex phenomenon. Generally speaking, when the molar ratio between $NH_3$ and $SO_3$ is less than 1 (one), ammonium bisulfate, $(NH_4)HSO_4$ is created, a relatively sticky substance which promotes ash agglomeration. However, when the molar ratio between $NH_3$ and $SO_3$ is more than 1, there is an increase in the ammonium sulfate production, resulting in the creation of submicron particles. Fine particles increase the space charge and affect the voltage-current (VI) curves of ESP. To maintain the same level of current as existed without fine particles, the voltage must be increased.

The proposed process of ammonia addition is based on a first step of optimizing the $SO_3$ content using the above algorithm, and adding ammonia in an amount responsive to a predefined stoichiometric ratio. The molar mass flow rate of ammonia injected is calculated to be at least about 1.0-1.2 times the molar mass flow rate of the sulfur trioxide, and preferably from about 1.2 to slightly less than 2.0 times the molar mass flow rate of the sulfur trioxide. Or, stated alternatively, the mass flow rate of the ammonia is such that the normal stoichiometric ratio (NSR) of ammonia relative to sulfur trioxide is at least 0.5, and preferably slightly less than 1.0. In fact, a proposed process of ammonia control is based on first, established a flow rate of $SO_3$ and adjusting the flow rate of ammonia based on the previously identified NSR. There are several additional phenomena taking place in the inter-electrode space which might help in a search for an optimum ammonia injection rate.

Space charge is a phenomenon which could be defined as a charge present in the inter-electrode space (between two or more oppositely charged electrodes) due to the flow of ions, or a cloud of the charged particles. As the size of the ions is fairly well defined, and their mobility is relatively high, the space charge created by the ions present in the inter-electrode space could be easily calculated. The space charge imposed by the cloud of the charged particulate matter, however, would be greatly dependent on the particle size distribution, for the same particulate mass could be represented by a few big particles or a large number of the smaller ones. This would present even more problems when dealing with the cloud of the charged fumes or smoke with mass mean diameter (MMD) of less than 1 micron (sub-micron range). Assuming further that the mobility of the particulate is somewhat similar, the cloud of the finer charged matter could present a barrier (or obstacle) to the ions in their quest ("run") to carry charges from one electrode to the other. Hence, the other phenomenon called "corona quenching."

Consequently, the CONTROLLER would use the $SO_3$ mass flow rate as a feed-forward control signal indicative of the total mass flow rate of the $SO_3$ injected using the molar ratio of 1 to 1 or the NSR of 0.5 as a starting point to ensure the adequate ammonium bisulfate presence. Further steps of increasing the ammonia flow rate would result in the NSR approaching 1.0 with increased generation of the ammonium sulfate.

As discussed previously, ammonium sulfate is produced as a fine powder which in small quantities can be removed from the combustion gas stream, however, as the ammonia flow rate would increase, yielding increase in the NSR (approaching 1.0) the precipitators would receive more and more fine powder which, respectively, would promote higher space charge and could ultimately result the corona quenching effect (reduction of the corona current to nearly zero value).

Using the precipitator's voltage (V) and current (I) readings as a feedback signal, and analyzing the first derivative (FIG. 4) and its "sign" in particular, should prevent the corona quenching and assist in the CONTROLLER smooth operation. Specifically, as the CONTROLLER starts to add the ammonia, both voltage and current should start reacting and depending on the sign of the current's first derivative, the system determines its position on the curve depicted on the FIG. 4. In particular, if the sign is "POSITIVE" (i.e. dI/dt is in the '+' zone, area 'A') the precipitator is operating in the "good" region and the increase in the voltage yields the increase in the current respectively. However, should the system start entering the "CORONA SUPPRESSION" zone (area 'C') any increase in the voltage should yield rather significant reduction in the current ("NEGATIVE" sign of the first derivative).

Figure 4:
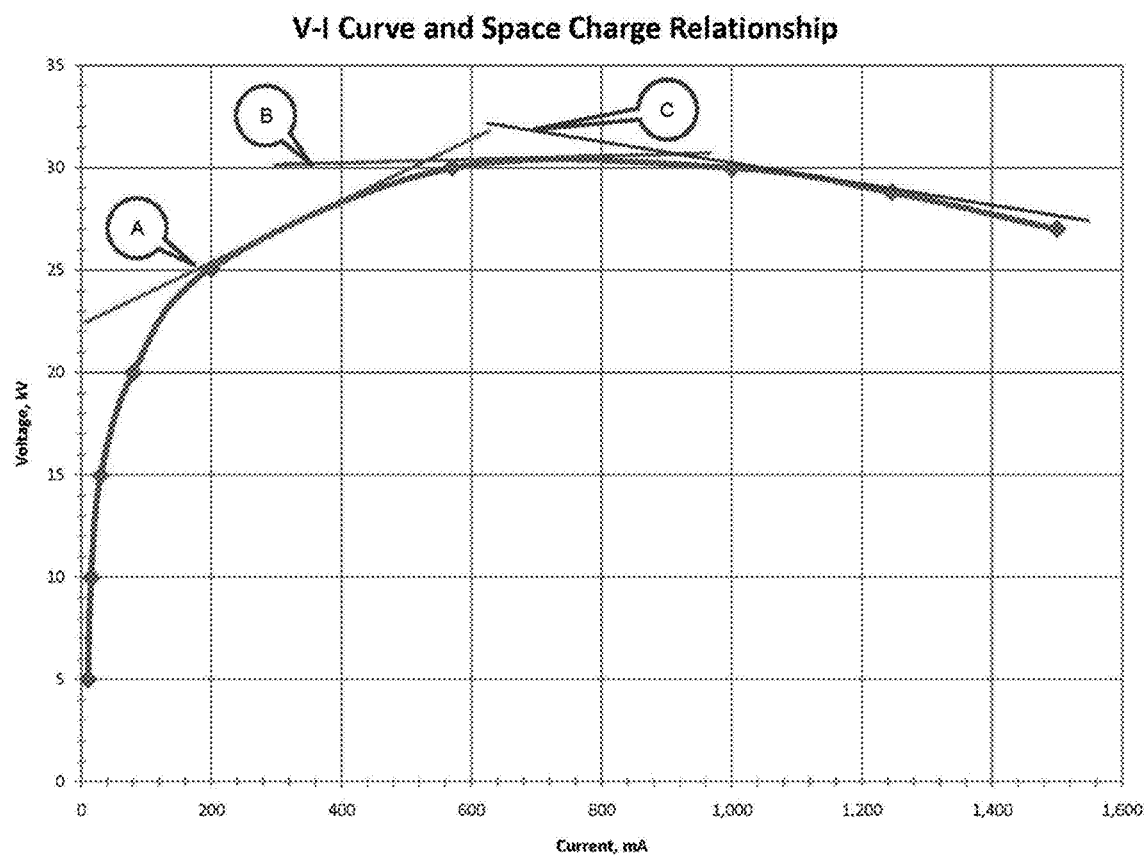
FIG. 4. shows Space Charge Effect.
Figure 5:
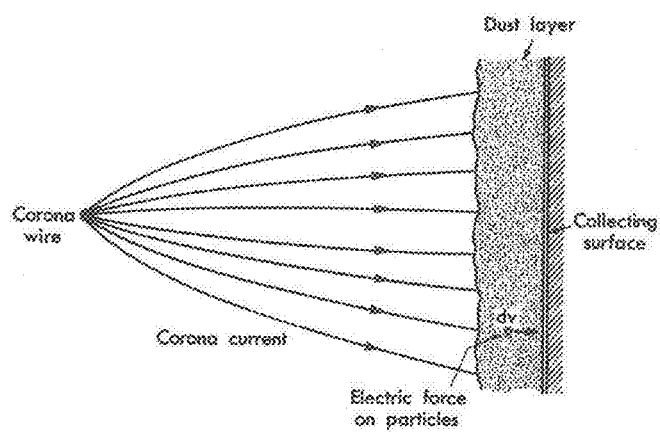
FIG. 5. shows Dust Layer Formation.

The main distinction between the graphs depicted in the FIG. 3 and the FIG. 4 is the time-response: i.e. the Power consumption change in response to the change in the $SO_3$ injection ate is a slow process and might take from 30 min. to several hours to manifest the desired results; the Space Charge effect, on the other hand is a product of a chemical reaction taking place in the inter-electrode space and it typically results in a virtually instant system response.

The feed-forward control signals of sulfur trioxide flow rate and boiler load are used by the CONTROLLER system as a coarse indicator of the amount of ammonia to be injected. The feedback signals of the precipitator's Voltage and Current provide a basis for fine adjustment of the amount of ammonia to be injected, in other words trimming the flow rate of ammonia added such that the amount of ammonia approaching a preselected value.

If the sulfur trioxide mass flow rate in the gas flow stream suddenly changes significantly due to a change in the power output of the plant, nature of the fuel, or some other operating parameter, the combination of the feed-forward and feedback signals aid in returning the residual sulfur trioxide and ammonia levels in the gas stream to pre-set, or pre-selected previously tested and approved amounts, in a short time. The signals also ensure that the ammonia injection is optimal during steady state operation. The establishment of a minimum ammonia molar mass flow rate ensures that there will be minimal sulfur trioxide emission, while the feedback control of ammonia content ensures that there will be minimal ammonia emission to the environment.

2 Dual FGC System Control

Although the combination of sulfur trioxide and ammonia conditioning agents is currently used in many power plants to improve the quality of the gas stream emitted to the atmosphere, it is difficult to determine the correct amount of each conditioning agent to add to the flue gas stream to achieve optimal results, under the wide variety of operating conditions possible. If relatively too much sulfur trioxide is added, there may be residual sulfur trioxide (and sulfur dioxide) in the gas released to the atmosphere, a cause of acid rain. If relatively too little sulfur trioxide is added, the electrostatic precipitator does not operate at its highest collection efficiency, and particulate is released in the atmosphere.

The ammonia reduces the amount of residual sulfur trioxide in the flue gas by forming ammonium sulfates and bisulfates. The ammonium bisulfates have the added beneficial effect of acting as a binder of the deposited fly ash in the electrostatic precipitator, so that there is a decreased likelihood that deposited fly ash can become re-entrained in the gas stream to be exhausted through the stack and into the atmosphere.

2.1 Automatic $SO_3$ FGC Control

The following offers a method for determining the best value for the $SO_3$ flow rate.

FIG. 3 illustrates the basis for the approach. It presents a graph of the power (P) in kilowatts (kW) flowing in the electrostatic precipitator, which can be viewed as the power consumed by the precipitator as a function of the $SO_3$ flow rate (F). Power is defined as the product of the secondary current and the secondary voltage (P=I*V). The flow rate (F) is the total mass flow rate of conditioning agent divided by the total mass flow rate of the gas stream, and is such can be viewed as a normalized flow rate.

Since the mechanism of the formation of the dust (FIG. 2, FIG. 6) is through electrical charge conduction, the power consumption of the electrostatic precipitator measures the effectiveness of the collection of particulate matter by the precipitator. Up to a point, the larger the power consumed, the more particulate matter is collected in the precipitator.

In an "Initial Region" of FIG. 3 the functional relationship shows that increasing the $SO_3$ flow results in increased power consumption, as desired. However, above a branching point (A), there may be either of two different behaviors, depending upon a number of factors, such as type of precipitator, gas flow rate, type of fuel being burned, etc. On a "First Branch", increasing the $SO_3$ flow rate results in decreased power consumption.

The first branch behavior is often observed for high gas velocities across the precipitator face. Another case might be when there is still a severe back corona exists, i.e. $SO_3$ attachment problems (one of the reasons to use the Dual FGC). On a "Second Branch", increasing the $SO_3$ flow rate results in increasing power consumption. Second Branch behavior is sometimes observed for low velocities of gas across the precipitator face.

It is not possible to predict with certainty which branch will be followed for any particular electrostatic precipitator and operating conditions. If, for example, the boiler operates at a low to moderate generation level, the functional relationship may follow the Second Branch. At a later time, if the boiler is operated at a high generation level, the functional relationship may shift to the First Branch. The purpose of the proposed algorithm is to provide for a stable, near-optimal injection of the $SO_3$, regardless of the nature of the system behavior.

To avoid the instability resulting from such shifting behavior, while attaining a high level of precipitator power consumption, $SO_3$ is initially introduced at a flow rate near to, but slightly below, that corresponding to a maximum point A in the First Branch curve. A desired operating range is slightly less than the maximum point A, to avoid the inherent instability resulting from the separation between the First Branch and the Second Branch.

The slope or derivative of the functional relationship between power consumption P and flow rate of conditioning agent F, $-dP/dF$ has been selected as the basis for controlling the flow rate of the $SO_3$. Because the value of P decreases to the right of the maximum point (A) of the First Branch curve, the use of the functional value of P as a function of F (as distinct from the derivative) runs the risk of producing ambiguous results. Thus, attempting to control the $SO_3$ flow based upon a preselected value of power consumption or upon maximizing the power consumption can lead to control system error. The derivative, however, when properly used can prevent any system problems.

The derivative $dP/dF$ of the functional relationship between P and F, at an operating point within the operating range, is represented by a line B. If the value of $dP/dF$ is specified to be a preselected, small positive number, there is no ambiguity as to its associated flow rate F or its functional relation within the Initial Region or on either the first or the second branch.

Consequently, if the derivative $dP/dF$ is greater than the preselected operating range, then the value of F is to the left of the operating range (A), and the flow rate of conditioning agent must be increased to bring the system back to the operating point and operating range. Conversely, if the derivative $dP/dF$ is less than the preselected operating range, then the system may be operating either on the Second Branch if the derivative is slightly less than the operating range, or on the First Branch if the derivative is much less than the operating range, or less than zero (negative value). In either of these cases, however, it is known with certainty that the flow rate F must be decreased to bring the system back to the desired operating range.

The operating point of the first derivative $dP/dF$ and the operating range are selected empirically for any particular power plant operation. In a typical operating case, presented by way of example, the desired value for the derivative $dP/dF$ might be 0.05 kilowatts of power per part per million of the conditioning gas. The operating range in this case might be selected as from zero to 0.10 kilowatts per part per million.

The principal complicating factor in this analysis is that the power level P may not respond instantaneously to changes in the conditioning agent flow rate F, and in fact there may be a lag time of up to several hours between a change in F and a responsive change in P. However, this phenomenon is taken into account by a delay time used in pairing F values with P values. That is, one may use the F value measured at an earlier time in conjunction with a currently measured value of P. The time difference between the taking of the F measurement and the P measurement then becomes the delay or lag time for the computation. To introduce the delay time into the computations, a chain rule derivative approach should be used.

2.1.1 Algorithm

Specifically, the suggested algorithm offers a method for controlling the flow of $SO_3$ including the steps of measuring a derivative $dF/dt$ of a flow rate (F) of the $SO_3$ into the flue gas as a function of time (t), at a first time $t_1$; measuring a derivative $dP/dF$ of the precipitator power consumption (P) as a function of time (t), at a second time $t_2$; and controlling the flow rate of the conditioning agent such that the first derivative of the power consumption as a function of the flow rate of the $SO_3$, $dP/dF$, is within a preselected operating range, the step of $SO_3$ flow control including:

i. determining a measured value of $dP/dF$ by dividing $dP/dt$ by $dF/dt$ ii. comparing the measured value of $dP/dF$ with the preselected operating range, iii. adjusting the $SO_3$ flow rate (F) as necessary so as to maintain the value of $dP/dF$ within the preselected operating range, iv. the value of (F) being reduced if $dP/dF$ is less than the preselected operating range, and v. increased if $dP/dF$ is greater than the preselected operating range.

Figure 6:
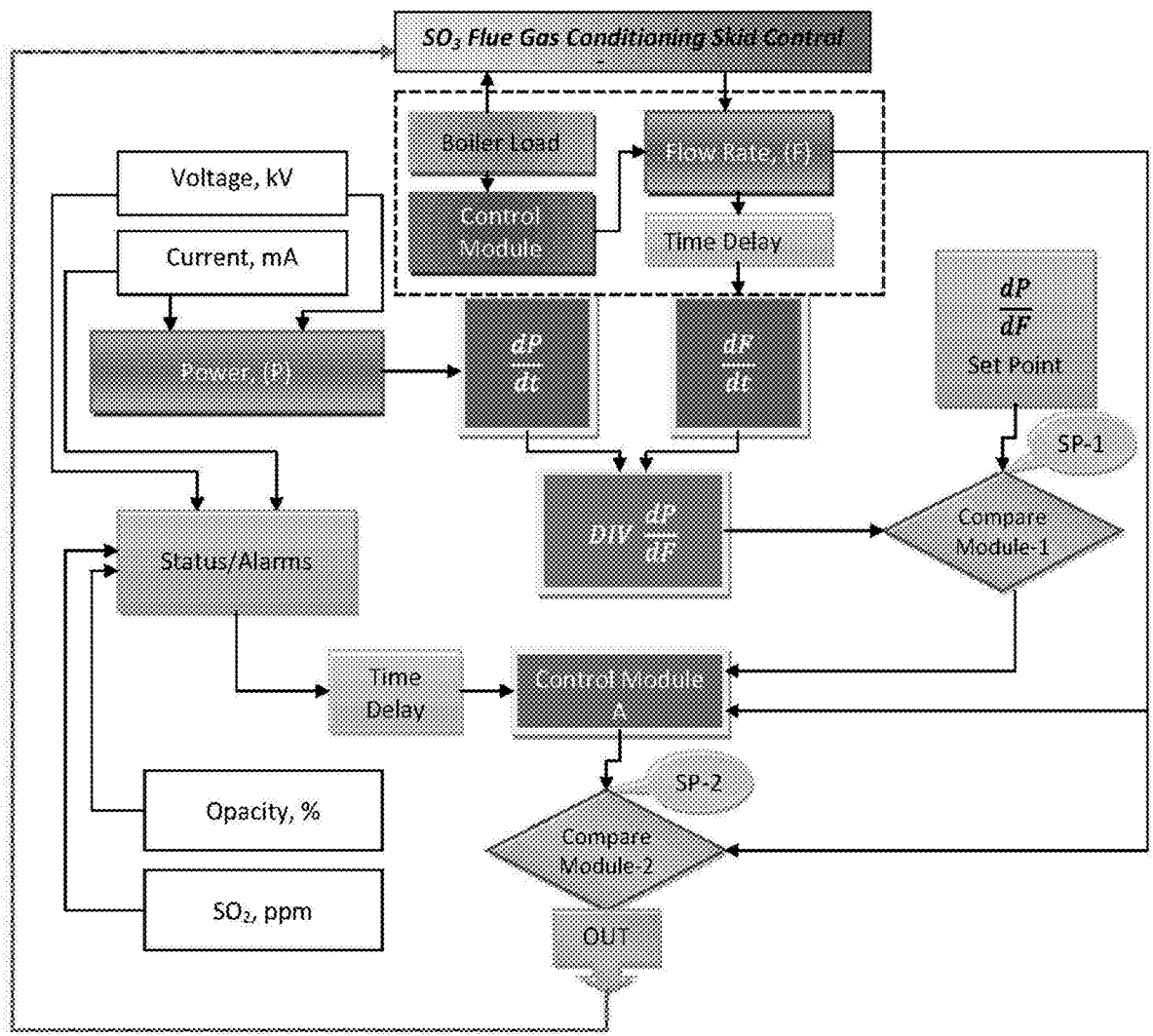
FIG. 6. shows a Simplified Control Logic.

A simplified control logic that controls the flow rate F of the conditional agent is illustrated in FIG. 6. Digital inputs of power consumption from individual power supplies are provided to the CONTROLLER from the precipitator power supply units. (The number of the utilized power inputs may be selected based on the operational characteristics of the individual boilers and their operating conditions.) These inputs are used in two ways. First, they are provided to a rate alarm 'STATUS/ALARMS' that senses whether the individual input has changed status, that is, has gone out of service or entered service. The individual outputs of the rate alarms are logically OR'd in OR function to signal whether any of the individual inputs has changed its status. If so, then a timer 'TIME DELAY' activates a respective mode in the control unit 'CONTROL MODULE A' to output a value equal to the measured flow rate F for a pre-selected time period. The output of the 'CONTROL MODULE A' block is the set-point (SP-2) to the 'OUTPUT BLOCK' which is essence is a control sign for the $SO_3$ flow rate adjustment. The digital inputs of the power consumption 'POWER (P)' are also added together to obtain a total instantaneous power consumption of the electrostatic precipitator. The adder may be programmed to add together all of the digital inputs, or only some portion or grouping of the power supplies.

The derivative of the power P with time t, dP/dt, is calculated by a separate module/differentiator (dP/dt). This differentiation takes place over a period of time, and a moving average derivative may be used. It is important to understand gross changes of power consumption as a result of changes in operating conditions and conditioning gas, not short term changes that might occur from local fluctuations. While a power plant is a large piece of apparatus and structure, it can undergo short term fluctuations. If the controller were permitted to adjust to each short term fluctuation, it would tend to oscillate widely. Instead, overall performance averaged over time periods of minutes or hours is used.

The current measured flow rate of the conditioning agent relative to the flow rate of the gas stream (BOILER LOAD), the rate F in parts per million 'FLOW RATE (F)', is obtained from $SO_3$ FGC System Control. As noted previously, experience may show that the current power consumption may be a result of a flow rate of conditioning agent that occurred sometime previously, and therefore a 'TIME DELAY' is provided. That is, the value of F used in a calculation may be that obtained at time $t_1$ and the value of P that obtained at time $t_2$. $t_1$ and $t_2$ may be same, or $t_1$ may be earlier than $t_2$. It is recommended that values of F and P are measured and stored in a memory, and a running time average of each is calculated to avoid short term fluctuations, and these averages are stored. The appropriate derivatives may then be calculated, as described below.

The 'DELAY TIME' used in selecting values may vary with type of the boiler, fuel, and its operating conditions. 'DELAY TIME' information is typically developed during initial operating trials. The delay time values for particular operating conditions and changes in operating condition should be stored in the database s are then refined with continued experience.

The derivative of the flow rate F of the conditioning agent with time t, dF/dt, is determined by a differentiator module of the same general type as a differentiator module (dP/dt) described previously. The current measured value of dP/dF is found by dividing dP/dt by dF/dt at divider module DIV dP/dF. As discussed previously, the value of dP/dF is the local slope of the curve in FIG. 3, and is the fundamental basis for control.

The value of dP/dF is compared with a set point value (SP-1), the preselected operating range 'SET POINT', in a proportional integral derivative calculation module 'COMPARE MODULE-2', whose output is a measure of the degree of deviation between the measured value of dP/dF and the operating range 'SET POINT.' This output is supplied to a scaling multiplier in the "CONTROL MODULE A'. The output of which is then supplied as the set point (SP-2) to a second proportional integral derivative calculation in the 'COMPARE MODULE-2'. (As described previously, alarm conditions cause the set point SP-2, produced by the 'CONTROL MODULE A', to be set equal to the measured value of flow rate for a pre-selected time period.) The other input to the 'CONTROL MODULE A' is the measured value of the 'FLOW RATE (F)'. The output of the 'COMPARE MODULE-2' is a signal that controls the main flow of the molten sulfur ($SO_3$ flow) of the $SO_3$ FGC Skid. If the derivative dP/dF is smaller than the operating range, then F is decreased, and if the derivative dP/dF is greater than the operating range, F is increased. The amount by which F is changed may be in linear or nonlinear proportion to the value of dP/dF; it is recommended that it should be an externally preset constant amount.

The particular operating range for a power plant is also determined for the plant and particular operating conditions, and no fixed value can be specified. The operating range of the derivative dP/dF is preferably as narrow as possible, and the absolute value of dP/dF is also as small as possible while maintaining stability of the system. Instability is judged by whether P values fluctuate between values on the first and second branches. If such fluctuations are observed, then the absolute value of the operating range is adjusted to a slightly higher value, and the observations are repeated. A stable operating range of dP/dF is eventually reached, and the CONTROLLER operates about that point.

2.2 Ammonia Injection Control Concept and Proposed Algorithm

Although the indicated chemistry of ammonia conditioning appears to be straightforward, there are practical obstacles to achieving a properly controlled ammonia addition for dual FGC application. A change in the flow rate of the combustion gas stream produces a corresponding change in the mass flow rate of the sulfur trioxide. Similarly, a change in fuel mix or air flow to the combustor or a number of other factors can cause changes in the mass flow rate of the sulfur trioxide. Because of the large mass of the power plant and the nature of the chemical reactions, there is a delay time between a change in the mass flow rate of the $SO_3$ and the time at which it is detected and the mass flow rate of the ammonia changed accordingly.

The Dual Injection System Controller (CONTROLLER) system for controlling the addition of conditioning agents to a particulate containing flue gas stream incorporates a feedforward signal that senses the flue gas and provides a feedforward signal indicative of the mass flow rate of particulate matter in the flue gas prior to the addition of the conditioning agents, and a feedback sensor that senses the flue gas after the addition of the conditioning agents, and produces a feedback signal indicative of the precipitator performance, and a controller that receives the feedforward signal and the feedback signals and adjusts the amounts of the conditioning agents added to the flue gas stream based upon the values of the signals.

The "feedforward" signal is one that is measured at a location prior to (upstream of) the point where the conditioning agents are added to the flue gas stream. It preferably is used to indicate the general magnitude, volume, and mass of the particulate matter in the flue gas stream. Some typical feedforward signals are the boiler load, which can be measured as the flow rate of the gas stream from the boiler, fuel flow, the heat input to the boiler, or a related signal that can be conelated to boiler load. The "feedback" signal is one that is measured at a location subsequent to (downstream from) the point where the conditioning agents are added to the flue gas stream. It is used to indicate the effect of the conditioning agents. Typical feedback signals include one or more of the quantities opacity of the stack gas, $SO_2$ content, and the power consumption (or its components) of the electrostatic precipitator.

Figure 7:
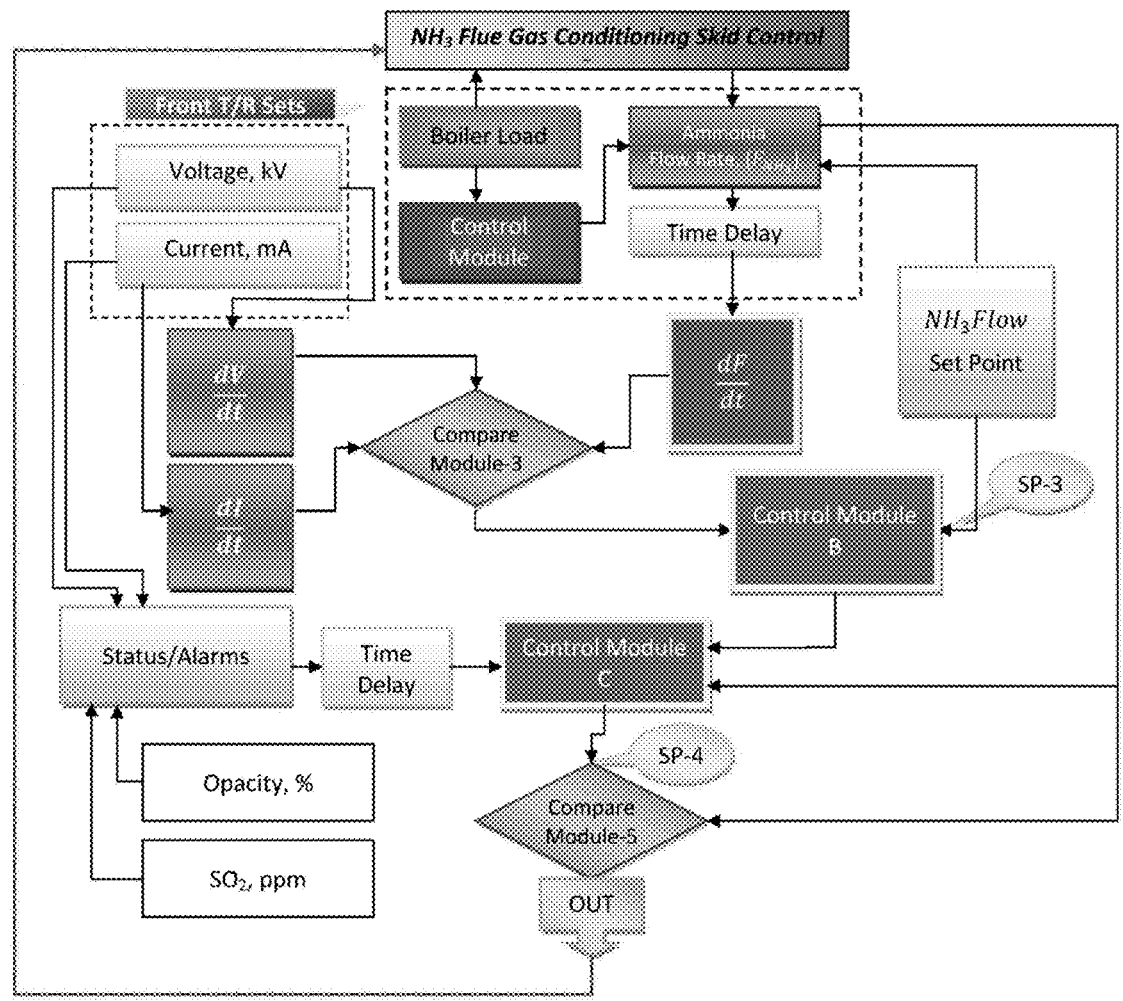
FIG. 7. shows an Automatic Ammonia Control Logic.

FIG. 7 presents a simplified diagram of the proposed logic. Briefly, the ammonia injected reacts with the sulfur trioxide, and water vapor in the flue gas stream, to produce ammonium bisulfate, $NH_4HSO_4$, or, under certain stoichiometric conditions discussed previously, ammonium sulfate, $NH4_2SO_4$. On one hand, the ammonia reaction reduces the amount of free sulfur trioxide still available to deposit upon the particulate. On the other hand, the ammonium bisulfate has a melting point of about 147° C., so that a melted layer of the ammonium bisulfate when it present upon the surface of the particulate, acts in the manner of a binding agent, binding the particulate together and to the collecting electrodes. This binding action desirably reduces the tendency for reentrainment of the particulate after deposition in the dust layer, and particularly during rapping, thereby reducing the emitted particulate in the stack gas. The ammonium sulfate also has an effect upon the efficiency of the electrostatic precipitator by modifying the space charge within the collecting elements.

FIG. 8 through FIG. 11 describe several possible combinations of the first derivatives of the voltage and current in the front fields in response to the ammonia flow changes. The set-point for the ammonia flow rate SP-3 is initially set at a calculated value based on an established flow of the $SO_3$ and preselected stoichiometric ratio of $SO_3/NH_3$ by the module "$NH_3$ Flow Set Point." The flow rate is then changed by an amount equal to SIGN (INCR), where "SIGN" is positive (+) or negative (−) and "INCR" is a preselected flow rate incremental change. For example, the increment INCR might be selected to be 1 part of ammonia per million parts flue gas (i.e., 1 ppm $NH_3$). During the system initialization, the first step SIGN attached to INCR is determined b y an analysis of the effects of a prior change, and can be plus (+), indicating an increase, or minus (−), indicating a decrease. A '+(INCR)' where INCR is 1 ppm, signifies that, whatever the flow rate $F_{NH3}$ is at the moment, it is to be increased by 1 ppm in the next control cycle. A '−(INCR)' that is with a minus sign, means that the flow rate $F_{NH3}$ at that moment is to be decreased by 1 ppm for the next control cycle. The value of SIGN is determined by the control logic of FIG. 7, and will be described later in more details. The value of "INCR", i.e., 1 ppm, 2 ppm, etc., is initially selected based upon experience, but may subsequently be adjusted in proportion to the value of the $F_{SO_3}$, $F_{SO3}$ measurement described earlier. The smaller the value of INCR, the longer it will take to reach a near-optimum flow rate, but the smaller the swings about that near-optimum flow rate when it is reached.

Figure 8:
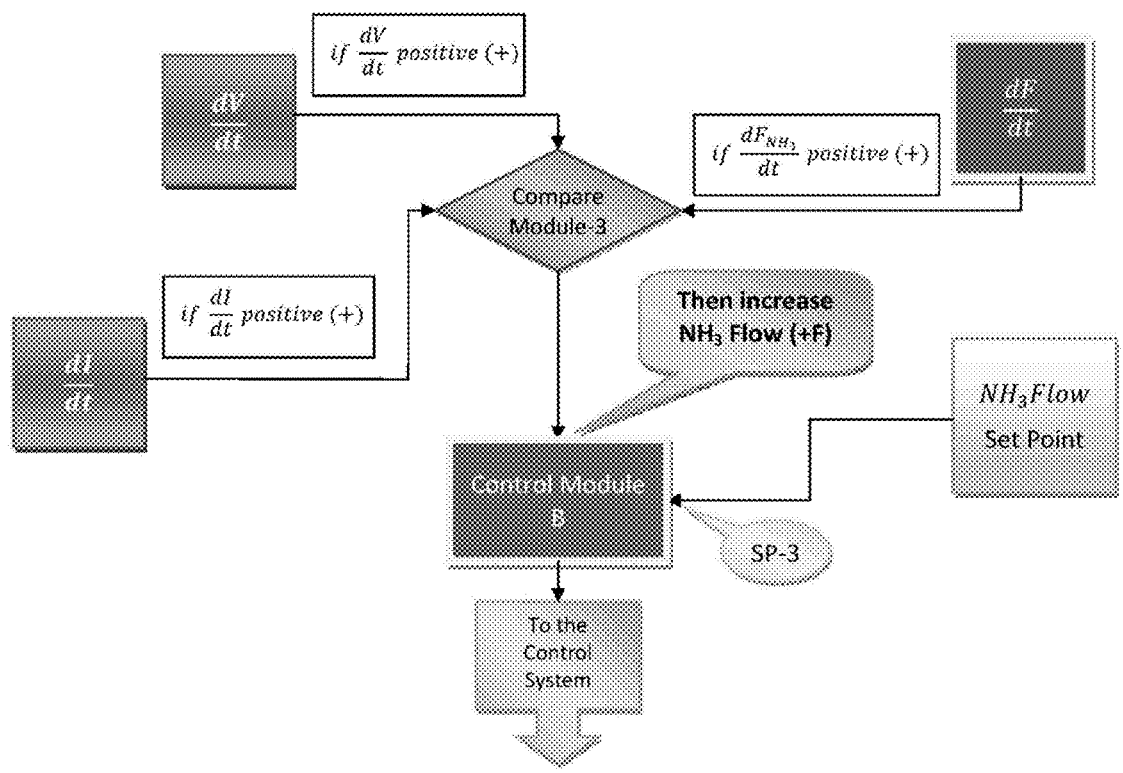
FIG. 8. shows a "Positive-Positive" Option.
Figure 9:
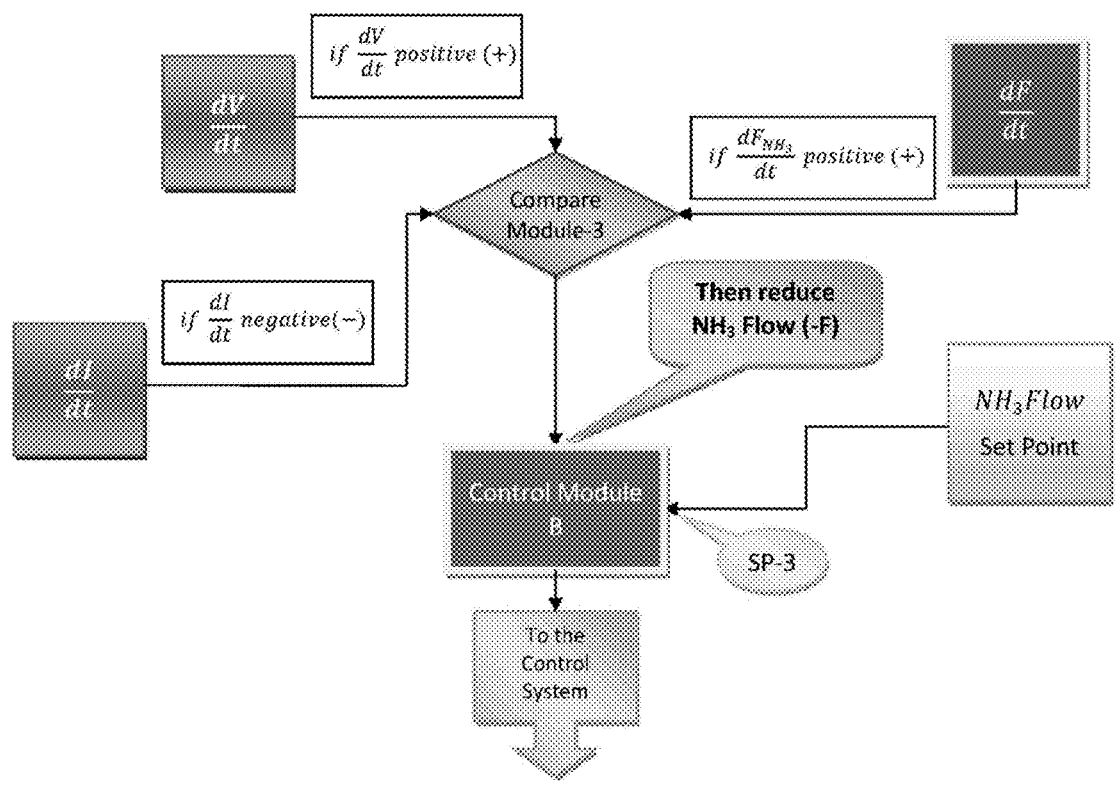
FIG. 9. shows a "Positive" Voltage-"Positive" $NH_3$ Change-"Negative" Current Option.
Figure 10:
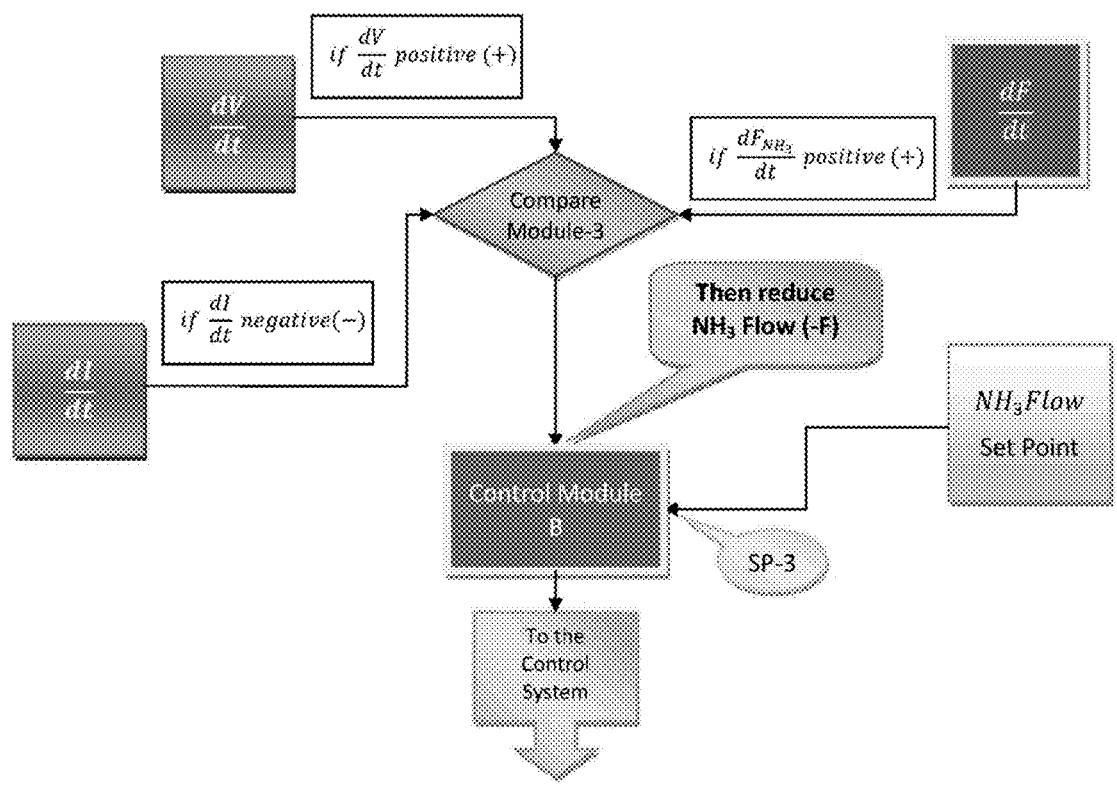
FIG. 10. shows a "Positive" Voltage-"Negative" $NH_3$ Change-"Negative" Current Option.

Initially, the sign is set to be 'POSITIVE' (FIG. 8). Thus, for a first control cycle, the set point SP-3 of the ammonia flow rate FNH3 is '+INCR' so that the flow rate is increased by the amount of INCR. Contrary to the $SO_3$ Control Logic there is very short time delay or wait-time, for the effect of the change in the flow rate FNH3 should cause virtually instant chemical reaction and the nearly immediate response in the power usage in the precipitator front fields. Subsequently, values of both dV/dt and dI/dt are calculated and tested, blocks dV/dt and dI/dt. (The calculations and relationship of the first derivatives was discussed previously in relation to FIG. 4. If the values of the first derivatives both are 'POSITIVE' (FIG. 8) in the next control cycle the sign remains unchanged and the set point (SP-3) is again changed in the same direction as in the prior control cycle. On the other hand, if the value of dI/dt should become negative (FIG. 9) in the next control cycle SIGN is changed from its prior value, block dF/dt (FIG. 10), and the set point is changed by the value of (SIGN)(INCR). For example, if in some control cycle the value of SIGN was positive and dI/dt is determined to be negative, then on the next control cycle the value of SIGN becomes negative (FIG. 10).

Figure 11:
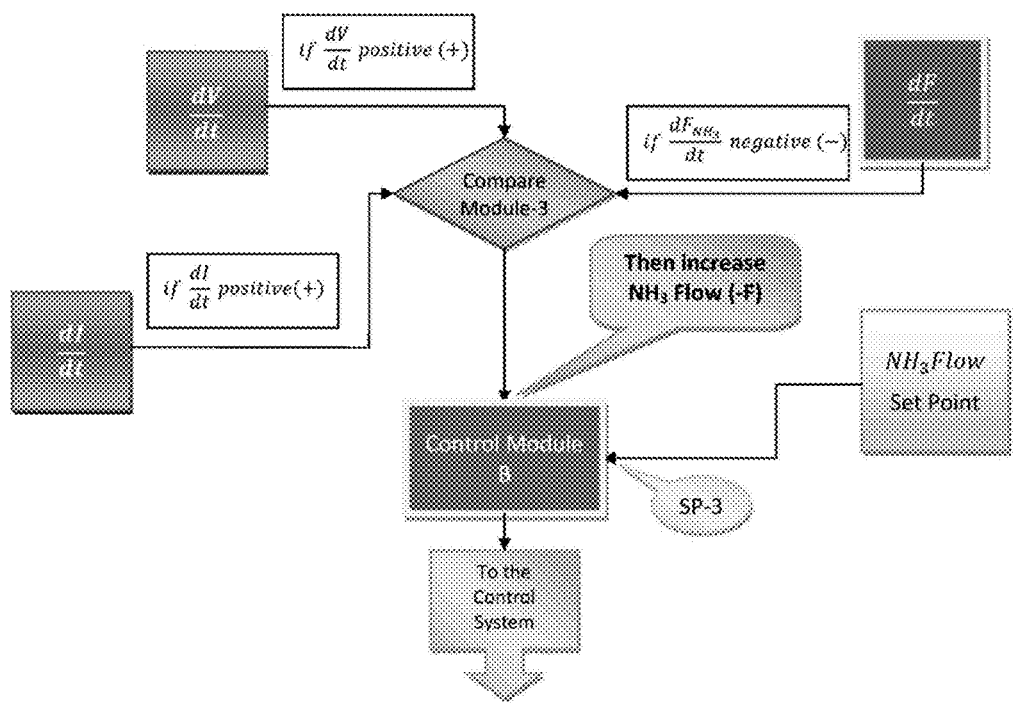
FIG. 11. shows "Positive" Voltage-"Negative" $NH_3$ Change-"Positive" Current Option.

If both first derivatives dV/dt and dI/dt return the "POSITIVE" values, respective (next) step change of the SIGN, is set in the opposite direction, i.e. to the positive '+INCR' value (FIG. 11).

In fact, if dI/dt is positive, the prior change in set point of the conditioning agent flow rate $F_{NH_2}$ was in the proper direction to move the system toward the operating range (FIG. 4). If dI/dt is negative, the prior change in set point (SP-3) was in the wrong direction to move the system toward the operating range (FIG. 4) and the next increment must be reversed. A zero value of dI/dt means that the system is within the proper operating range and at the preferred operating point. In this case of a zero value of dI/dt, there are several options. In the preferred approach illustrated in FIG. 7, SIGN is changed to establish a perturbation about the preselected operating point of FNH3. Alternatively, SIGN could be maintained the same to drive the value of FNH3 past the preferred operating point until the system was moved to the extremum of the operating range. In another alternative, a further change in SP-3 could simply be deferred for some period of time. The preferred approach establishes an oscillation about the preferred operating point, in the preselected operating range.

Several descriptions and illustrations have been presented to aid in understanding the present invention. One with skill in the art will realize that numerous changes and variations may be made while keeping the spirit of the invention. Each of these changes and variations are within the scope of the present invention. The scope of the present invention is not limited to what is shown in any figure or illustration.

The invention claimed is:

1. An automatic control system for flue gas conditioning at a coal-fired power plant of the type where sulfur trioxide $SO_3$ is injected into a flue gas stream by an $SO_3$ injector to control emissions, the $SO_3$ injector having a mass flow rate $F_{SO3}$; the plant also having a plurality of precipitators powered by precipitator power supplies supplying a total instantaneous power of P; the automatic control system comprising:
   a first moving average differentiator module connected to the precipitator power supplies configured to produce a first signal representing dP/dt;
   a second moving average differentiator module connected to the $SO_3$ injector configured to produce a second signal representing $dF_{SO3}/dt$;
   a divider module configured to divide values represented by the first and second signals to produce a third signal representing $dP/dF_{SO3}$, the divider module supplying the third signal to a compare module;
   wherein, the compare module is constructed to compare $dP/dF_{SO3}$ to a predetermined set point $SP_1$;
   a controller having a control cycle connected to the compare module, the controller configured to maintain the value of $dP/dF_{SO3}$ within an operating range about $SP_1$ by adjusting the $SO_3$ flow rate $F_{SO3}$ as necessary to maintain the value of $dP/dF_{SO3}$ within the preselected operating range; the first controller constructed to produce an $SO_3$ control signal the $SO_3$ injector to reduce $F_{SO3}$ when $dP/dF_{SO3}$ is less than the preselected operating range and to increase $F_{SO3}$ when $dP/dF_{SO3}$ is greater than the preselected operating range.

2. The automatic control system of claim 1, wherein $dP/dt$ is computed at a first time $t_1$, and $dF_{SO3}/dt$ is computed at a second time $t_2$, and wherein $t_2$ is later than $t_1$.

3. The automatic control system for flue gas conditioning of claim 1, further comprising a power monitoring module constructed to measure P.

4. The automatic control system for flue gas conditioning of claim 1, wherein the operating range for $dP/dF_{SO3}$ has an absolute value, and the controller is configured to recognize system instability using the power monitoring module by determining if fluctuations exist between a region where P increases with increasing $F_{SO3}$ and a region where P decreases with increasing $F_{SO3}$, and if said instability exists, increasing the absolute value of the operating range for $dP/dF_{SO3}$.

5. The automatic control system for flue gas conditioning of claim 4, wherein the controller is configured to set the operating range for $dP/dF_{SO3}$ to a stable operating range when no system instability is detected.

6. The automatic control system for flue gas conditioning of claim 1, further comprising a feedforward signal is representative of flow rate of the flue gas stream from the boiler or fuel flow to the boiler, the feedforward signal also being considered by the controller in adjusting $F_{SO3}$.

7. The automatic control system for flue gas conditioning of claim 1, further comprising a feedback signal is representative of opacity of stack gas, $SO_2$ content of stack gas or power consumption of an electrostatic precipitator P, the feedback signal also being considered by the controller in adjusting $F_{SO3}$.

8. An automatic control system for flue gas stream conditioning at a coal-fired power plant of the type where both sulfur trioxide $SO_3$ and ammonia $NH_3$ are injected into a flue gas stream by $SO_3$ and $NH_3$ injectors respectively to control emissions, the $SO_3$ injector having a mass flow rate $F_{SO3}$; the $NH_3$ injector having a mass flow rate of $F_{NH3}$; there being a stoichiometric ratio of $SO_3/NH_3$ determined by $F_{SO3}$ and $F_{NH3}$; the plant also having a plurality of precipitators powered by precipitator power supplies having an instantaneous power of P, voltage V and current I; the automatic control system comprising:

a first moving average differentiator module connected to the precipitator power supplies configured to produce a first signal representing $dP/dt$;

a second moving average differentiator module connected to the $SO_3$ injector configured to produce a second signal representing $dF_{SO3}/dt$;

a divider module configured to divide values represented by the first and second signals to produce a third signal representing $dP/dF_{SO3}$, the divider module supplying the third signal to a first compare module;

wherein, the first compare module is constructed to compare $dP/dF_{SO3}$ to a predetermined set point $SP_1$;

a first controller having an $SO_3$ control cycle connected to the first compare module, the first controller configured to maintain the value of $dP/dF_{SO3}$ within an operating range about $SP_1$ by adjusting the $SO_3$ flow rate $F_{SO3}$ as necessary to maintain the value of $dP/dF_{SO3}$ within the preselected operating range; the first controller constructed to produce an $SO_3$ control signal the $SO_3$ injector to reduce $F_{SO3}$ when $dP/dF_{SO3}$ is less than the preselected operating range and to increase $F_{SO3}$ when $dP/dF_{SO3}$ is greater than the preselected operating range;

a feedforward module located upstream of the $SO_3$ and $NH_3$ injectors providing a feed-forward signal responsive to volume or mass of particulate matter in the flue gas stream prior to injection of $SO_3$ or $NH_3$ into the flue gas stream;

a feedback module located downstream of the $SO_3$ and $NH_3$ injectors providing a feedback signal responsive to volume or mass of particulate matter in the flue gas stream after injection of $SO_3$ or $NH_3$ into the flue gas stream;

a third moving average differentiator module connected to the precipitator power supplies configured to produce a first signal representing $dV/dt$;

a fourth moving average differentiator module connected to the precipitator power supplies configured to produce a second signal representing $dI/dt$;

a fifth moving average differentiator module connected to the $NH_3$ injector configured to produce a third signal representing $dF_{NH3}/dt$;

a second compare module coupled to a second controller having an $NH_3$ control cycle comparing the $dV/dt$, $dI/dt$ and to adjust an $NH_3$ setpoint $SP_3$, that determines the $NH_3$ flow rate $F_{NH3}$;

wherein, the second controller is configured initialize $SP_3$ based on the stoichiometric ratio of $SO_3/NH_3$; and $SP_3$ is changed by a predetermined amount INCR, or remains unchanged on each $NH_3$ control cycle, such that when a 2-valued control signal SIGN has a value of positive (+), $SP_3$ is increased by the predetermined amount INCR, and when SIGN has a value that is negative (−), $SP_3$ is decreased by the predetermined amount INCR;

wherein, the second controller is configured to initialize SIGN to positive (+);

wherein, each $NH_3$ control cycle, the second compare module and the second controller are configured such that if $dV/dt$, $dI/dt$ and $dF_{NH3}/dt$ are all positive, SIGN remains unchanged, and if $dV/dt$ and $dF_{NH3}/dt$ are positive and $dI/dt$ is negative, the SIGN is changed;

wherein, the second controller is also configured to compare the feedforward signal with the feedback signal to determine the stoichiometric ratio of $SO_3/NH_3$.

9. The automatic control system of claim 8, wherein the $NH_3$ controller is configured to adjust the stoichiometric ratio of $SO_3/NH_3$ by changing $SP_3$ to achieve a zero value of $dI/dt$.

10. The automatic control system of claim 9, wherein, when $dI/dt$ is zero, the controller is configured to periodically change $SP_3$ to establish an oscillation about a preferred operating point.

11. The automatic control system for flue gas conditioning of claim 8, wherein an initial value of the stoichiometric ratio of $SO_3/NH_3$ is set to a preselected setpoint.

12. The automatic control system of claim 8, wherein the stoichiometric ratio of $SO_3/NH_3$ determines a ratio of $NH_4HSO_4$ to $(NH4)_2SO_4$ produced by injection of $SO_3$ and $NH_3$ into the flue gas stream.

13. The automatic control system of claim 8, wherein $dP/dt$ is computed at a first time $t_1$, and $dF_{SO3}/dt$ is computed at a second time $t_2$, and wherein $t_2$ is later than $t_1$.

14. The automatic control system for flue gas conditioning of claim 8, further comprising a power monitoring module constructed to measure P.

15. The automatic control system for flue gas conditioning of claim 8, wherein the operating range for $dP/dF_{SO_3}$ has an absolute value, and the first controller is configured to recognize system instability using the power monitoring module by determining if fluctuations exist between a region where P increases with increasing $F_{SO_3}$ and a region where P decreases with increasing $F_{SO_3}$, and if said instability exists, increasing the absolute value of the operating range for $dP/dF_{SO_3}$.

16. The automatic control system for flue gas conditioning of claim 15, wherein the first controller is configured to set the operating range for $dP/dF_{SO_3}$ to a stable operating range when no system instability is detected.

\* \* \* \* \*